US012683313B2

(12) United States Patent
Suzuki et al.

(10) Patent No.: US 12,683,313 B2
(45) Date of Patent: Jul. 14, 2026

(54) ELECTRICAL CONNECTION MEMBER MATERIAL AND ELECTRICAL CONNECTION MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Amane Suzuki, Mie (JP); Toshiro Sakai, Mie (JP); Masaki Nonogawa, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 188 days.

(21) Appl. No.: 18/283,177

(22) PCT Filed: Mar. 15, 2022

(86) PCT No.: PCT/JP2022/011652
§ 371 (c)(1),
(2) Date: Sep. 20, 2023

(87) PCT Pub. No.: WO2022/202494
PCT Pub. Date: Sep. 29, 2022

(65) Prior Publication Data
US 2024/0162643 A1 May 16, 2024

(30) Foreign Application Priority Data
Mar. 24, 2021 (JP) ................................ 2021-050404

(51) Int. Cl.
*H01R 13/03* (2006.01)
*C23C 28/00* (2006.01)

(52) U.S. Cl.
CPC ......... *H01R 13/03* (2013.01); *H01R 2201/26* (2013.01)

(58) Field of Classification Search
CPC ......... C23C 28/00; C23C 28/023; C25D 5/12; H01R 13/03
See application file for complete search history.

(56) References Cited

U.S. PATENT DOCUMENTS 9,692,162 B2 * 6/2017 Sunaga ................. C25D 5/505
10,297,773 B2 * 5/2019 Koizumi ............. H10K 71/621
(Continued)

FOREIGN PATENT DOCUMENTS

JP S60-258483 A 12/1985
JP H03-158230 A 7/1991
(Continued)

OTHER PUBLICATIONS

International Search Report issued on May 24, 2022 for WO 2022/202494 A1 (4 pages).

*Primary Examiner* — Abdullah A Riyami
*Assistant Examiner* — Thang H Nguyen
(74) *Attorney, Agent, or Firm* — Venjuris, P.C.

(57) ABSTRACT

It is aimed to provide an electrical connection member material and an electrical connection member capable of suppressing adhesion in an Ag layer even without using a special metal layer. An electrical connection member material 1 is provided with a metal material 10 including an Ag layer 13 on a surface, a surface hardness of the Ag layer 13 being 90 HV or more, and a coating layer 2 for covering the surface of the metal material 10. The coating layer 2 is formed by bringing an organic compound having a mercapto
(Continued)

group into contact with the surface of the metal material 10. Further, an electrical connection member includes the electrical connection member material 1.

8 Claims, 1 Drawing Sheet

(56) References Cited

U.S. PATENT DOCUMENTS

| | | | | |
|---|---|---|---|---|
| 10,773,498 | B2 * | 9/2020 | Murase | B32B 27/08 |
| 2003/0186597 | A1 * | 10/2003 | Suzuki | H01R 13/03<br>439/886 |
| 2010/0040905 | A1 * | 2/2010 | Fukuike | C09C 3/08<br>106/404 |
| 2015/0236439 | A1 * | 8/2015 | Okubo | C25D 5/10<br>439/886 |
| 2016/0260916 | A1 * | 9/2016 | Koizumi | C23C 18/1605 |
| 2017/0037935 | A1 * | 2/2017 | Arima | C09D 163/00 |
| 2019/0214758 | A1 * | 7/2019 | Kato | H01R 13/11 |

FOREIGN PATENT DOCUMENTS

| | | | | | |
|---|---|---|---|---|---|
| JP | H09-249977 | A | | 9/1997 | |
| JP | 2000-282033 | A | | 10/2000 | |
| JP | 2020-143307 | A | | 9/2020 | |
| JP | 2020-196911 | A | | 12/2020 | |
| WO | WO-02057511 | A1 | * | 7/2002 | C23C 28/028 |
| WO | WO-2015076358 | A1 | * | 5/2015 | C23C 28/00 |
| WO | WO-2015083547 | A1 | * | 6/2015 | C25D 5/505 |

* cited by examiner

ELECTRICAL CONNECTION MEMBER MATERIAL AND ELECTRICAL CONNECTION MEMBER

CROSS REFERENCE TO RELATED APPLICATIONS

This application is a national phase of PCT application No. PCT/JP2022/011652, filed on 15 Mar. 2022, which claims priority from Japanese patent application No. 2021-050404, filed on 24 Mar. 2021, all of which are incorporated herein by reference.

TECHNICAL FIELD

The present disclosure relates to an electrical connection member material and an electrical connection member.

BACKGROUND

In an electrical connection member such as a connection terminal for large current used in an automotive vehicle, a metal material having a silver (Ag) layer formed on a surface by plating or the like may be used. The metal material having the Ag layer is excellent in heat resistance, corrosion resistance and electrical conductivity, whereas surface wear and peeling easily occur because Ag is soft and has a property of easy adhesion. If the Ag layer is partially removed due to wear or peeling and the metal of a lower layer such as a base material or underlayer is exposed, electrical connection characteristics of the surface change. The wear and peeling of the Ag layer caused by adhesion particularly easily occur in a high-temperature environment.

To suppress adhesion on the surface of the Ag layer, a material for constituting the metal material is being studied. In one aspect of the material study, it is studied to provide a predetermined Ag alloy layer instead of the Ag layer or provide an underlayer made of predetermined metal below the Ag layer or Ag alloy layer. A study in such an aspect is, for example, disclosed in Patent Document 1. Further, as another aspect, it has been tried to suppress the adhesion of an Ag layer by providing a metal layer having a predetermined composition on a surface of a mating member to be brought into contact with an electrical connection member having the Ag layer exposed on an outermost surface. A study in such an aspect is, for example, disclosed in Patent Document 2.

PRIOR ART DOCUMENT

Patent Document

Patent Document 1: JP 2020-196911 A
Patent Document 2: JP 2017-162598 A

SUMMARY OF THE INVENTION

Problems to be Solved

In a metal material containing Ag on a surface layer, it is an effective means for reducing the adhesion of Ag to devise a composition or structure of the surface layer or a mating metal layer to be brought into contact with the surface layer as described in Patent Documents 1, 2 and the like. However, if the wear and peeling due to the adhesion of Ag and, further, those phenomena in a high-temperature environment can be suppressed in a general metal material including an Ag layer without using a metal layer having a special composition or structure, the metal material including Ag layer is more easily used for application as an electrical connection member such as a terminal. Accordingly, it is aimed to provide an electrical connection member material and an electrical connection member capable of suppressing adhesion in an Ag layer even without using a special metal layer.

Means to Solve the Problem

An electrical connection member material of the present invention is provided with a metal material including an Ag layer on a surface, a surface hardness of the Ag layer being 90 HV or more, and a coating layer for covering the surface of the metal material, the coating layer being formed by bringing an organic compound having a mercapto group into contact with the surface of the metal material. Here, the hardness number expressing the surface hardness of the Ag layer (i.e., 90 HV) is a unit of hardness according to the Vickers hardness (HV) scale.

An electrical connection member of the present disclosure includes the electrical connection member material.

Effect of the Invention

The electrical connection member material and the electrical connection member according to the present disclosure can suppress adhesion in the Ag layer even without using a special metal layer.

DETAILED DESCRIPTION TO EXECUTE THE INVENTION

Description of Embodiments of Present Disclosure

Figure 1:
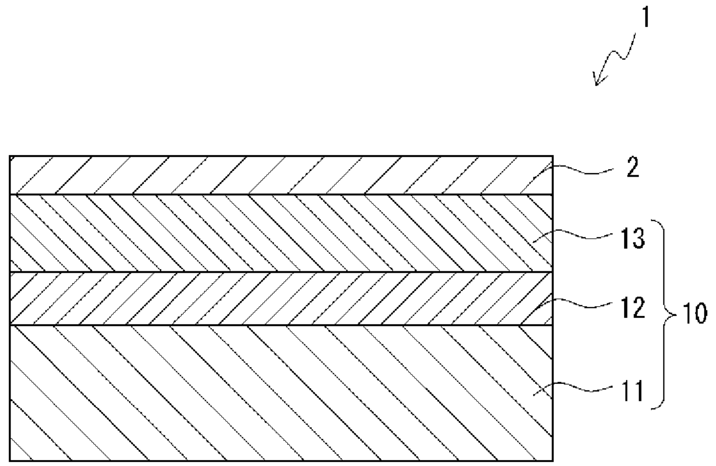
FIG. 1 is a schematic diagram showing a cross-section of an electrical connection member material according to one embodiment of the present disclosure.

First, embodiments of the present disclosure are listed and described.

The electrical connection member material according to the present disclosure is provided with a metal material including an Ag layer on a surface, a surface hardness of the Ag layer being 90 HV or more, and a coating layer for covering the surface of the metal material, the coating layer being formed by bringing an organic compound having a mercapto group into contact with the surface of the metal material.

When the surface of the electrical connection member material contacts another member, the Ag layer having a surface hardness of 90 HV or more contacts the other member via the coating layer. Since the Ag layer is configured as the hard Ag layer having a hardness of 90 HV or more and the surface of that hard Ag layer is covered by the coating layer formed using the organic compound having the mercapto group, the adhesion of Ag and the wear and peeling of the Ag layer associated therewith are unlikely to occur when the electrical connection member material contacts with or slides against the other member. The coating layer formed using the organic compound having the mercapto group stably maintains a state covering the surface of the Ag layer even at high temperatures and demonstrates a high effect of suppressing the adhesion of the Ag layer also in a high-temperature environment.

Here, the organic compound may have an aromatic ring. Then, until a high temperature is reached, the state covering the surface of the Ag layer by the coating layer is stably kept and a high effect of suppressing the adhesion of the Ag layer is obtained also in the high-temperature environment.

In this case, the aromatic ring is a hetero ring containing at least one of a sulfur (S) atom and a nitrogen (N) atom in addition to a carbon (C) atom. Then, the stability of the state covering the surface of the Ag layer by the coating layer is further enhanced, and the adhesion of the Ag layer can be highly suppressed after the high-temperature environment and even if a large surface pressure is applied to the surface of the electrical connection member material.

The electrical connection member according to the present disclosure includes the above electrical connection member material. Since the Ag layer is covered by the coating layer formed using the organic compound having the mercapto group as described above, the wear and peeling of the surface of the electrical connection member material according to the present disclosure caused by adhesion are unlikely to occur even if the electrical connection member material contacts with or slides against another member. Further, those phenomena due to the adhesion of Ag can be suppressed also in a high-temperature environment. By configuring the electrical connection member using the material having such characteristics, the wear and peeling of the Ag layer caused by adhesion are unlikely to occur and the occurrence of those phenomena can be suppressed even after the high-temperature environment in the electrical connection member.

Here, the electrical connection member may be configured as a connection terminal including a contact point portion to be brought into electrical contact with a mating electrically conductive member, and the coating layer may be formed on the surface of the metal material at least in the contact point portion. Then, the adhesion of Ag caused by contact with or sliding against the mating electrically conductive member and the wear and peeling of the Ag layer associated therewith are unlikely to occur in the contact point portion of the connection terminal, and characteristics such as electrical connection characteristics and heat resistance given to the contact point portion by the Ag layer can be satisfactorily maintained. Further, the adhesion is unlikely to occur on the surface of the Ag layer and the characteristics given by the Ag layer can be maintained even after the heating of the contact point portion associated with energization or the like.

In this case, a surface pressure to be applied to the contact point portion may be 30 MPa or more. In the connection terminal, as the surface pressure applied to the contact point portion increases, adhesion is more likely to occur on the metal layer on the surface of the contact point portion. Since the hard Ag layer is formed on the surface of the contact point portion and the surface of that hard Ag layer is covered by the coating layer in the electrical connection member, the adhesion of Ag and the wear and peeling of the Ag layer associated therewith are unlikely to occur on the surface of the contact point portion.

[Details of Embodiment of Present Disclosure]

Hereinafter, an embodiment of the present disclosure is described in detail using the drawings.

<Summary of Electrical Connection Member Material and Electrical Connection Member>

First, the configurations of an electrical connection member material and an electrical connection member according to the embodiment of the present disclosure are briefly described.

(Electrical Connection Member Material)

The electrical connection member material according to the embodiment of the present disclosure has such a structure that a surface of a metal material is covered by a coating layer. The electrical connection member material according to the embodiment of the present disclosure can be suitably used as a material for constituting an electrical connection member such as a connection terminal.

FIG. 1 is a section showing the configuration of an electrical connection member material (hereinafter, may be referred to as a connection material) 1 according to one embodiment of the present disclosure. The connection material 1 includes a metal material 10 and a coating layer 2 covering a surface of the metal material 10. The metal material 10 includes a base material 11 and an Ag layer 13. Further, an underlayer 12 is arbitrarily provided between the base material 11 and the Ag layer 13.

The base material 11 of the metal material 10 is configured as a metal plate material. A specific metal type constituting the base material 11 is not particularly limited, but copper (Cu) or Cu alloy generally used as a base material of an electrical connection member such as a connection terminal can be suitably used since being excellent in electrical conductivity, mechanical characteristics and the like.

The Ag layer 13 is configured as a layer of hard Ag and exposed on the outermost surface of the metal material 10. A hardness on the surface of the hard Ag is generally 90 HV or more, preferably 110 HV or more. The Ag layer 13 may contain an additive element for hardening the Ag layer 13 in addition to Ag and unavoidable impurities besides containing only Ag and unavoidable impurities. Selenium (Se), antimony (Sb), carbon (C), nitrogen (N), sulfur (S) and the like can be cited as additive elements of that type. Above all, the use of Se, C or S as the additive element is preferable. A range of 0.1 atom % or more and 5.0 atom % or less can be illustrated as an addition amount of those additive elements. Note that the hardness in this specification is measured in accordance with JIS Z 2244:2009 and shows a numerical value obtained when a measurement was conducted at HV0.01 (10 gf) in a micro-Vickers hardness test.

A thickness of the Ag layer 13 is not particularly limited, but preferably 1 μm or more, more preferably 3 μm or more, for example, in terms of sufficiently exhibiting characteristics of Ag. On the other hand, the thickness of the Ag layer 13 is preferably 100 μm or less in terms of avoiding the use of an excessive amount of Ag and the like. The Ag layer 13 may be formed by an arbitrary method such as a plating method or deposition method. The use of the plating method is particularly preferable in terms of convenience, hardness control and the like.

Another metal layer may be provided as the underlayer 12 between the base material 11 and the Ag layer 13 as appropriate. The underlayer 12 may be composed of only one layer or two or more types of laminated metal layers. If the base material 11 is made of Cu or Cu alloy, a layer made of nickel (Ni) or Ni alloy can be illustrated as a suitable example of the underlayer 12. The underlayer 12 made of Ni or Ni alloy functions to suppress the diffusion of Cu atoms from the base material 11 to the Ag layer 13 and enhance the adhesiveness of the Ag layer 13 to the base material 11. In the metal material 10, parts of metal atoms constituting the layers on both sides may form an alloy on an interface between the layers adjacent to each other.

In the connection material 1 according to this embodiment, the coating layer 2 is provided to cover the Ag layer 13 while being held in contact with the surface of the Ag layer 13 exposed on the surface of the metal material 10. The coating layer 2 is a layer formed by bringing an organic compound having a mercapto group (—SH group) into contact with the surface of the Ag layer 13 of the metal material 10. Although the coating layer 2 is described in detail later, an effect of suppressing the adhesion of Ag and the wear and peeling of the Ag layer 13 associated therewith is demonstrated by the coating layer 2 covering the surface of the Ag layer 13. Further, also when the metal material 10 is heated to a high temperature, the wear and peeling of the Ag layer 13 caused by adhesion are suppressed.

(Electrical Connection Member)

Next, the electrical connection member according to one embodiment of the present disclosure is described. The electrical connection member according to this embodiment includes the electrical connection member material 1 according to the embodiment of the present disclosure described above.

A connection terminal can be cited as an example of the electrical connection member. The connection terminal includes a contact point portion to be brought into electrical contact with a mating electrically conductive member and includes the Ag layer 13 made of hard Ag and the coating layer 12 covering the surface of the Ag layer 13 on the surface of the base material 11 at least in the contact point portion. If the Ag layer 13 and the coating layer 2 are formed at least in the contact point portion on the surface of the connection terminal, the Ag layer 13 and the coating layer 12 may cover the entire surface of the connection terminal or may cover only a partial region.

Figure 2:
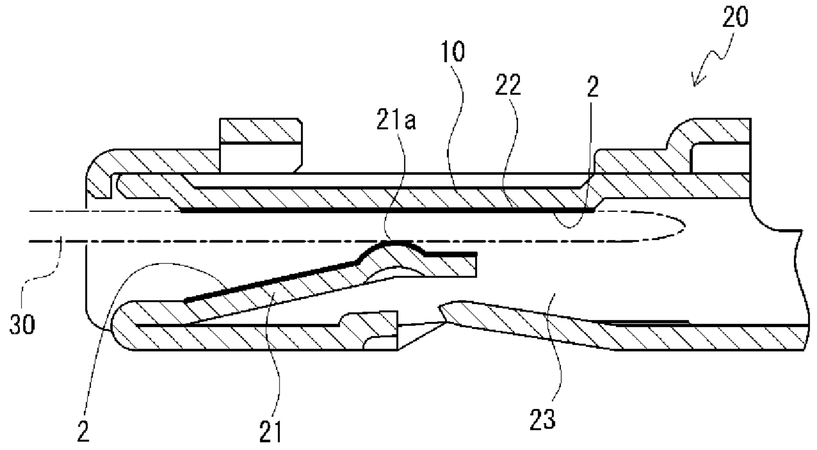
FIG. 2 is a section showing a connection terminal serving as an electrical connection member according to the embodiment of the present disclosure.

Specific type and shape of the connection terminal are not particularly limited. A female connector terminal 20 is shown as an example of a connection terminal according to the embodiment of the present disclosure in FIG. 2. The female connector terminal 20 has a shape similar to that of a known fitting-type female connector terminal. That is, a narrow pressure portion 23 is formed into a tubular shape open on a front side, and a resilient contact piece 21 folded inwardly and rearwardly is provided inside the bottom surface of the narrow pressure portion 23. If a male connector terminal 30 in the form of a flat plate-like tab is inserted as a mating electrically conductive member into the narrow pressure portion 23 of the female connector terminal 20, the resilient contact piece 21 of the female connector terminal 20 contacts the male connector terminal 30 and applies an upward force to the male connector terminal 30 at an embossed portion 21*a* bulging inwardly of the narrow pressure portion 23. A surface of a ceiling part of the narrow pressure portion 23 opposed to the resilient contact piece 21 serves as an inner facing contact surface 22. By pressing the male connector terminal 30 against the inner facing contact surface 22 by the resilient contact piece 21, the male connector terminal 30 is pressed and held in the narrow pressure portion 23.

The female connector terminal 20 is entirely made of the metal material 10 including the Ag layer 13 on the outermost surface described above. Here, the surface of the metal material 10 formed with the Ag layer 13 is facing inward of the narrow pressure portion 23 and arranged to constitute the surface facing the resilient contact piece 21 and the inner facing contact surface 22. In a part including the embossed portion 21*a* of the resilient contact piece 21 and the inner facing contact surface 22, the coating layer 2 is formed on the surface of the metal material 10.

On the surface of the embossed portion 21*a* and the inner facing contact surface 22 to be brought into contact with the surface of the male connector terminal 30, the surface of the Ag layer 13 is covered by the coating layer 2, whereby an effect of suppressing the adhesion of the Ag layer 13 is exhibited by the coating layer 2 in those parts. As a result, even if the male connector terminal 30 slides when being inserted into the narrow pressure portion 23 of the female connector terminal 20, the wear and peeling of the Ag layer 13 caused by adhesion are unlikely to occur. Further, even if the male connector terminal 30 and the female connector terminal 20 in a connected state are left for a long period of time or become hot due to energization or the like while being left in the connected state, the wear and peeling of the Ag layer 13 caused by the adhesion of Ag are unlikely to occur. In the female connector terminal 20, a surface pressure applied from a top part of the embossed portion 21*a* to the surface of the male connector terminal 30 by a surface pressure of the contact point portion, i.e. a resilient restoring force of the resilient contact piece 21, is preferably 30 MPa or more, further 40 MPa or more. As the surface pressure increases, the Ag layer 13 on the surface is pressed toward the surface of the male connector terminal 30 with a stronger force and the adhesion of Ag more easily occurs on the top part of the embossed portion 21*a*. However, since the surface of the Ag layer 13 is covered by the coating layer 2, the adhesion of Ag can be effectively suppressed even in a situation where a large surface pressure is applied as described above. However, if a surface pressure of about 4 to 5 times as large as the hardness of the Ag layer 13 on the surface is applied, the deformation of the Ag layer 13 in a part in contact with the surface of the male connector terminal 30 changes from resilient deformation to plastic deformation. Thus, the surface pressure is preferably suppressed to 5 times as large as the hardness of the Ag layer 13 or less.

Here, the entire female connector terminal 20 is made of the metal material 10 including the Ag layer 13, and only the parts of the Ag layer 13 to be brought into contact with the male connector terminal 30 are covered by the coating layer 2. However, as described above, formation ranges of the Ag layer 13 and the coating layer 2 are not particularly limited if the Ag layer 13 and the coating layer 2 are formed at least on the surface of the contact point portion to be brought into contact with the mating electrically conductive member. Further, a constituent material of the male connector terminal 30 is also not particularly limited. However, at least the surface of the tab-shaped portion of the male connector terminal 30 to be brought into contact with the contact point portion, i.e. the female connector terminal 20, is preferably made of the connection material 1 according to the embodiment of the present disclosure in which the Ag layer 13 formed as a layer of hard AG is provided on the surface of the base material 11 and the surface of the Ag layer 13 is covered by the coating layer 2, similarly to the female connector terminal 20. In this case, the Ag layers 13 made of hard Ag are in contact via two coating layers 2 in an electrically connected part between the female connector terminal 20 and the male connector terminal 30. Then, the wear and peeling of the Ag layer 13 caused by adhesion can be effectively suppressed at the contact point portions of not only the female connector terminal 20, but also the female connector terminal 30, and those effects are maintained even after the passage of a long period of time and after a high-temperature environment.

The connection terminal according to the embodiment of the present disclosure can take various forms such as a press-fit terminal to be pressed-fit and connected to a through hole formed in a printed board, besides the fitting-type female connector terminal 20 or male connector terminal 30 as described above. Various connection terminals according to the embodiment of the present disclosure can be, for example, used in the form of a connector by being accommodated into a connector housing made of an insulating material. Further, those connection terminals can be used in the form of a wiring harness by connecting that connector to an end of a wire.

<Configuration and Adhesion Suppressing Effect of Coating Layer>

As described above, in the connection material 1 according to the embodiment of the present disclosure, the Ag layer 13 made of hard Ag is formed on the surface of the metal material 10 and the surface of the Ag layer 13 is covered by the coating layer 2 formed of the organic compound having the mercapto group (—SH group). Ag is a metal susceptible to adhesion, but the occurrence of adhesion is suppressed in the Ag layer 13 covered by the coating layer 2.

Here, a situation where the layer of Ag is exposed on the outermost surface of the connection material without being covered by another layer is briefly described. Ag is a metal relatively less susceptible to oxidation, shows a low contact resistance on a surface and is excellent in heat resistance and corrosion resistance. By providing the layer of Ag on a surface of a connection material as a material of a connection terminal or the like, good electrical characteristics are easily maintained even in an environment where a high temperature is reached. On the other hand, Ag has a property of being very susceptible to adhesion. If adhesion occurs in a contact part with a mating member, Ag on the surface is worn or peeled if the contact part is slid or left in contact with the mating member. In the connection material having the layer of Ag on the surface, if the wear or peeling of Ag due to adhesion occurs, characteristics of Ag such as low contact resistance and heat resistance cannot be sufficiently utilized in the connection material. Further, if a base material such as Cu or Cu alloy or an underlayer made of Ni or Ni alloy present in the layer below Ag is exposed due to the wear or peeling of Ag, characteristics of the connection material such as electrical connection characteristics are possibly largely affected. Particularly, if the layer of Ag is formed also on the surface of the mating member, the Ag layers contact each other and the adhesion and the wear and peeling associated therewith easily occur in the both Ag layers. Further, if the connection material is left in a high-temperature environment with the Ag layer on the surface held in contact with the mating member or if a large contact load (surface pressure) is applied, the adhesion further advances due to a creep phenomenon or atomic diffusion.

However, in the connection material 1 according to the embodiment of the present disclosure, the Ag layer 13 on the surface of the metal material 10 is covered by the coating layer 2. When the connection material 1 contacts another member, the Ag layer 13 does not directly contact a surface of the mating member, but the coating layer 2 is interposed between the Ag layer 13 and the mating member. Thus, the Ag layer 13 becomes less susceptible to adhesion due to contact with or sliding against the mating member. As a result, the wear and peeling of the Ag layer 13 due to the adhesion of Ag are less likely to occur and characteristics of the Ag layer 13 such as low contact resistance and heat resistance are easily maintained even after contact with or sliding against the mating member. Particularly, in this embodiment, since the coating layer 2 is formed by bringing the organic compound having the mercapto group into contact with the Ag layer 13, a state where the coating layer 2 is covering the surface of the Ag layer 13 is stably maintained. This is thought to be because the coating layer 2 is firmly fixed to the surface of the Ag layer 13 due to easy bonding of Ag atoms and S atoms. Further, the state where the coating layer 2 is covering the surface of the Ag layer 13 is stably maintained even at high temperatures. Thus, even if the connection material 1 is placed in a high-temperature environment, the Ag layer 13 is unlikely to directly contact the surface of the mating member and the adhesion of the Ag layer 13 and the wear and peeling due to that are unlikely to occur. Further, even when a high load is applied to a contact part with the mating member, the adhesion of the Ag layer 13 is suppressed by the presence of the coating layer 2.

From these, the connection material 1 according to this embodiment can be suitably used as a constituting material of a connection terminal easily getting hot due to heating from a surrounding environment or heat generation by energization. A connection terminal for automotive vehicle can be illustrated as such a connection terminal. Further, in the connection material 1 according to this embodiment, a high adhesion suppressing effect is obtained only by forming the coating layer 2 by bringing the predetermined organic compound into contact with the surface of the Ag layer 13 configured as a layer of hard Ag, and a special metal layer for adhesion suppression is not required. Thus, versatility is high. A high adhesion suppressing effect can be given only by forming the coating layer 2 on a conventional general connection material or a connection material including an existing hard Ag layer.

In the connection material 1 according to this embodiment, the Ag layer 13 provided on the surface of the metal material 10 is formed as a layer of hard Ag. By making the Ag layer 13 of hard Ag, the adhesion of Ag can be highly suppressed on the surface obtained by covering the Ag layer 13 by the coating layer 2 as compared to the case where the Ag layer 13 is made of soft Ag roughly having a surface hardness of 60 HV or less. One of factors for the high adhesion suppressing effect is a high hardness of the hard Ag layer itself. Ag is a metal susceptible to adhesion, but the adhesion can be suppressed to a certain extent by enhancing the surface hardness through the addition of a small amount of an additive element, the control of crystal growth or the like. Another factor is that the magnitude of the effect of suppressing the adhesion, i.e. a degree of adhesion reduction based on a case where the coating layer 2 is not formed, is larger in the case of hard Ag layer than in the case of soft Ag layer by covering the surface of Ag by the coating layer 2 formed using the organic compound having the mercapto group as described in Examples later. This is supposed to be because the adhesion advances due to a formed gap of the coating layer since the Ag layer is plastically deformed and the coating layer cannot follow that deformation in the case of soft Ag layer, whereas the Ag layer 13 is unlikely to directly contact the surface of the mating electrically conductive member since plastic deformation is unlikely to occur and the coating layer 2 is unlikely to be broken in the hard Ag layer.

In this embodiment, the coating layer 2 is formed by bringing the organic compound having the mercapto group into contact with the Ag layer 13, but that organic compound needs not keep an initial state in the formed coating layer 2. For example, a S—H bond of the mercapto group (—SH group) may be cleaved and the organic compound may constitute the coating layer 2 in a thiolate state from which H atoms were desorbed. In this case, assuming that the organic compound used to form the coating layer 2 is expressed by R—SH, a S—Ag bond is formed between the organic compound and the Ag layer 13 and the organic compound is possibly strongly bonded to the Ag layer 13 in the form of an R—S—Ag structure. The formation of this structure is particularly preferable in terms of enhancing the stability of the coating layer 2. Alternatively, there is also a possibility that a bond between a C atom and a mercapto group (—SH group) constituting the organic compound is cleaved and the organic compound is bonded to the Ag layer 13 in the form of R—Ag.

Besides, it is also thought to form the coating layer 2 by converting an organic compound having a mercapto group (—SH group) into the one having a sulfur-containing functional group other than the mercapto group. A sulfide bond (—S—), a disulfide bond (—S—S—), a thiocyanate group (—S—C═N), an isothiocyanate group (—N═C═S), a sulfo group (—$SO_3$), a sulfonyl group (—$SO_2$—), a sulfinyl group (—S(═O)—), a thioester group (—S—C(═O)—), a thiocarbonyl group (>C═S), a thiocarboxyl group (—C(═O)—SH) and the like can be cited as examples of the sulfur-containing functional group other than the mercapto group. Further, out of the R—SH structure of the organic compound having the mercapto group, a bond may be cleaved or converted in an R part. If the R part has a ring structure, a ring opening of the ring structure can be illustrated as an example of a bond cleavage. If the organic compound having the mercapto group is converted into another form and forms the coating layer 2 as in these cases, the coating layer 2 may not necessarily be formed by bringing the organic compound having the mercapto group into contact with the Ag layer 13. For example, the coating layer 2 may be formed by bringing a compound having the form after conversion itself into contact with the surface of the Ag layer 13. By either manufacturing method, if the form of the organic compound forming the coating layer 2 on the surface of the Ag layer 13 is the same, those coating layers 2 demonstrate a similar effect in suppressing the adhesion of the Ag layer 13. The organic compound constituting the coating layer 2 may be substantially in a single state, or two or more types of states may be mixed such as a state where the S—H bond is cleaved and a state where the S—H bond is not cleaved.

A thickness of the coating layer 2 is not particularly limited. For example, in terms of enhancing the effect of suppressing the adhesion of the Ag layer 13 by the coating layer 2, this thickness may be 1 nm or more. On the other hand, in terms of avoiding excessive outflow and stickiness of the organic compound and the like, this thickness may be 10 μm or less.

In forming the coating layer 2 by bringing the organic compound having the mercapto group into contact with the Ag layer 13, a specific form of contact is not particularly limited and contact methods such as application, immersion, instillation, distribution and spraying can be cited as such. A state of the compound at the time of contacting the Ag layer 13 is also not particularly limited. The organic compound in a liquid state may be directly brought into contact or the organic compound may be brought into contact after being appropriately dissolved, dispersed or diluted using a solvent or water. In bringing a solution containing the organic compound into contact with the Ag layer 13, the solution may be brought into contact after having a pH adjusted to about 5 to 7 to improve the stability of the organic compound. A sulfuric acid, a nitric acid, a hydrochloric acid, a phosphoric acid or the like is preferably used as a pH adjuster at that time. Further, after the contact, excess organic compound to form the coating layer 2 having a predetermined thickness may be appropriately removed by washing or the like using a solvent or water.

The organic compound for forming the coating layer is not particularly limited to a specific type if the mercapto group is included. The number of the mercapto groups contained in a molecule of the organic compound is also not particularly limited and may be one, two (dithiol), three or more. Further, only one type of the organic compound for constituting the coating layer 2 may be used or two or more kinds of organic compounds may be mixed.

In the R—SH structure of the organic compound, the R part is mainly composed of C atoms and H atoms, but a hetero atom such as N, O, S, P or Si may be contained in addition to those atoms as appropriate. Further, the R part may be constituted only by a chain structure or may at least partially contain a ring structure. Hydrocarbon groups such as an alkyl group, an alkenyl group and an alkynyl group and chain structures in which some of C atoms constituting those hydrocarbon groups are replaced by hetero atoms can be cited as examples of the chain structure constituting the R part. The chain structure may be a linear chain structure or may have a branch. The ring structure constituting the R part may be a nonaromatic ring or an aromatic ring. Alicyclic rings such as a cycloalkyl ring, rings in which some of C atoms of those are replaced by hetero atoms and the like can be cited as examples of the nonaromatic ring. The aromatic ring includes no hetero atom and benzene rings can be cited as such. Further, an imidazole ring, a triazine ring, an isocyanuric acid skeleton, a pyridine ring, a pyrazine ring, a pyrimidine ring, a pyridazine ring, a pyrazole ring, a triazole ring, a thiazole ring, a thiophene ring, a pyrrole ring and the like can be cited as examples of an aromatic ring containing a hetero atom, i.e. as a hetero ring. Two or more aromatic rings may be condensed. In this case, a plurality of aromatic rings to be condensed may be of the same type (e.g. naphthalene rings) or of different types (e.g. benzothiazole ring, benzimidazole ring). The R part may have both a chain structure and a ring structure and a plurality of chain structures and/or ring structures may be included in the R part. Further, substituents may be introduced into a chain part and/or a ring part as appropriate. Particularly, it is preferred to introduce a functional group, which can interact or form a bond with the surface of the Ag layer 13, besides the mercapto group. A molecular weight of the R part is not particularly limited, but is preferably 50 or more, more preferably 100 or more in terms of enhancing the stability of the structure in which the coating layer 2 covers the Ag layer 13. On the other hand, the molecular weight of the R part is preferably 1000 or less in terms of convenience in forming the coating layer 2 by contact with the Ag layer 13.

The organic compound having the mercapto group for constituting the coating layer 2 is particularly preferably an organic compound having an aromatic ring, out of the various compounds cited above. Then, the stability of the structure in which the formed coating layer 2 covers the surface of the Ag layer 13 is improved and the effect of suppressing the adhesion of the Ag layer 13 is enhanced. Particularly, the effect of suppressing the adhesion of the Ag layer 13 in a high-temperature environment is excellent. This is thought to be because the coating layer 2 is firmly fixed to the surface of the Ag layer 13 by the interaction of a conjugated π electron system of the aromatic ring having a planar structure with the surface of the Ag layer 13, together with interaction between a S atom and an Ag atom derived from the mercapto group. Above all, if the organic compound has a hetero ring containing at least one of a S atom and a N atom as a hetero atom, the formed coating layer 2 demonstrates a particularly high effect of suppressing the adhesion of the Ag layer 13 and maintaining an adhesion suppressing action at high temperatures. This is supposed to be because the interaction between the hetero atom included in the ring structure and the surface of the Ag layer 13 enhances the bondability of the coating layer 2 to the Ag surface. Only one hetero atom or a plurality of hetero atoms may be included in the aromatic ring, but it is preferred to include a plurality of hetero atoms. Further, at least a S atom is included in the aromatic ring. Further, if the organic compound has the aromatic ring, the mercapto group is particularly preferably bonded at a position near the aromatic ring. For example, the mercapto group is preferably directly bonded to the aromatic ring or bonded to a C atom directly bonded to the aromatic ring.

The followings can be cited as examples of the organic compound suitably usable to form the coating layer 2 and having a mercapto group and a heteroaromatic ring, but there is no limitation to this. One of these compounds may be singly used or two or more compounds may be used in combination.

(2-mercaptoethyl)pyrazine, 2-mercaptobenzimidazole, 2-mercapto-5-methylbenzimidazole, 5-amino 2-mercaptobenzimidazole, 2-mercaptobenzothiazole, 6-amino-2-mercaptobenzothiazole, 2-mercapto-5-methoxybenzothiazole, 2-mercapto-6-nitrobenzothiazole, 2-mercaptopyridine, 4-mercaptopyridine, 3-pyridylisocyanate, 3-nitropyridine-2-thiol, 2-mercapto-5-nitropyridine, thiocyanuric acid, 6-(dibutylamino)-1,3,5-triazine-2,4-dithiol, tris[2-(3-mercaptopropionyloxy)ethyl] isocyanurate, 2-(dibutylamino)-1,3,5-triazine-4,6-dithiol, 6-diarylamino-1,3,5-triazine-2,4-dithiol, 6-(4-vinylbenzyl-n-propyl)amino-1,3,5-triazine-2,4-dithiol, 6-(diisopropylamino)-1,3,5-triazine-2,4-dithiol, 6-anilino-1,3,5-triazine 2,4-dithiol The followings can be cited as examples of the organic compound suitably usable to form the coating layer 2 and having a mercapto group and an aromatic ring other than a heteroaromatic ring, but there is no limitation to this. One of these compounds may be singly used or two or more compounds may be used in combination.

2-phenylethanethiol, benzenethiol, benzylmercaptan, m-toluenethiol, o-toluenethiol, p-toluenethiol, 2-aminobenzenethiol, 3-aminobenzenethiol, 4-aminobenzenethiol, 2-hydroxybenzenethiol, 3-hydroxybenzenethiol, 4-hydroxybenzenethiol, 2-phenylethanethiol, 3,4-dimethylbenzenethiol, 3,5-dimethylbenzenethiol, 4-methylbenzyl mercaptan, 2,4-dimethylbenzenethiol, 2,5-dimethylbenzenethiol, 2-methoxybenzenethiol, 3-methoxybenzenethiol, 4-methoxybenzenethiol, 1,3-benzenethiol, 1,4-benzenethiol, 2-isopropylbenzenethiol, 4-isopropylbenzenethio, 4-(dimethylamino)benzenethiol, thiosalicylic acid, 3-mercaptobenzoic acid, 4-mercaptobenzoic acid, 4-methoxy-α-toluenethiol, 3-ethoxybenzenethiol, 4-nitrobenzenethiol, 4-(methylthio)benzenethiol, toluene-3,4-dithiol, 2-naphthalenethiol, 4-tert-butylbenzenethiol, methylmercaptobenzoic acid, 1,3-benzenedimethanethiol, 1,4-benzenedimethanethiol Besides those having the aromatic ring, the followings can be illustrated as examples of the organic compound suitably usable to form the coating layer 2 and having a mercapto group, but there is no limitation to this. One of these compounds may be singly used or two or more compounds may be used in combination.

1-propanethiol, isobutyl mercaptan, 1-butanethiol, 2-butanethiol, 3-mercapto-1-propanol, cyclopentanethiol, 3-mercapto-2-butanol, 2-methyl-1-butanthiol, 1-pentanethiol, isoamylmercaptan, 3-methyl-2-butanethiol, 3-mercapto 2-butanol, α-thioglycerol, 1,3-propanedithiol, 1,2-propanedithiol, cyclohexanethiol, 2-methyltetrahydrofuran-3-thiol, 3-mercapto-2-pentanone, hexylmercaptan, 3-mercaptoisobutyric acid, 3-methyl mercaptopropionate, 3-mercapto-3-methyl-1-butanol, L-cysteine, 1,2-butanedithiol, 1,4-butanedithiol, 2,3-butanedithiol, 2,3-dimercapto-1-propanol, 4-mercapto-4-methyl-2-pentanone, 1-heptanethiol, 1,5-pentanedithiol, 1-(mercaptomethyl)cyclopropaneacetic acid, 1-octanethiol, 2-ethyl-1-hexanethiol, 3-isopropyl mercaptopropionate, D-penicillamine, thiomalic acid, 1,6-hexanedithiol, dithioerythritol

EXAMPLES

Examples are described below. Note that the present invention is not limited by these examples. Here, an adhesion suppressing effect of Ag by forming a coating layer on a surface of an Ag layer was confirmed and differences in the effect caused by the hardness of the Ag layer and the type of the organic compound constituting the coating layer were verified. Samples were prepared and evaluated at room temperature in the atmosphere unless otherwise specified.

<Preparation of Samples>

First, a metal material was prepared. Specifically, a Ni layer having a thickness of 1 μm was formed on a surface of a clean Cu alloy base material by an electroplating method. Further, an Ag layer having a thickness of 5 μm was prepared on a surface of the Ni layer by the electroplating method. Here, two types of Ag layers including a hard Ag layer and a soft Ag layer were prepared. The hard Ag layer was hardened by containing 0.01 atom % of Se in Ag, and a surface hardness was 130 HV. The soft Ag layer contained no additive element for hardening and a surface hardness was 60 HV.

Subsequently, after the metal material including the hard Ag layer and the metal material including the soft Ag layer prepared above were processed into flat plate-like test pieces and embossed test pieces (R=3 mm or R=20 mm), a coating layer was formed on a surface of the Ag layer of each test piece. Specifically, each organic compound shown in Tables 1 and 2 was dissolved into water to have a concentration of 150 ppm and a pH thereof was adjusted to 5 by adding a phosphoric acid, whereby a raw material solution was prepared. Each test piece prepared above was immersed in that raw material solution for 30 seconds. Thereafter, a sample surface was cleaned in a water washing process and dried to obtain a test sample. Separately, test pieces having the same shapes were prepared also for the metal material formed with no coating layer.

<Evaluation Method>

Adhesion resistance was evaluated for each test sample obtained above. In evaluation, the embossed test piece was brought into contact with the surface of the flat plate-like test piece and the Ag layer of the flat plate-like test piece and that of the embossed test piece were held in contact via the coating layers covering the surfaces of the Ag layers at tops of embossed parts. In this state, a surface pressure was applied from the embossed test piece toward the flat plate-like test piece. At this time, the test pieces were respectively exchanged and two surface pressures including a large surface pressure and a small surface pressure were applied. Using an embossed part of R=3 mm, a surface pressure of 220 MPa was applied as the large surface pressure. Using an embossed part of R=20 mm, a surface pressure of 60 MPa was applied as the small surface pressure.

Each pair of the test pieces were left at room temperature for 2000 hours with the surface pressure applied as described above. Thereafter, a state of adhesion of a contact part between the test pieces was evaluated by an energy dispersive X-ray analysis (SEM/EDX) using a scanning electron microscope. A case where adhesion marks were hardly confirmed was evaluated as "A+" having very high adhesion resistance, and a case where adhesion marks were confirmed and partial peeling of Ag was confirmed, but the exposure of the Ni layer as an underlayer was not confirmed was evaluated as "A" having high adhesion resistance. On the other hand, a case where the exposure of the Ni layer as the underlayer was confirmed was evaluated as "B" having low adhesion resistance. Note that the sample evaluated to have low adhesion resistance (B) was regarded as unsuitable for practical use.

Further, a new pair of the prepared test pieces were left at a high temperature of 140° for 500 hours with the surface pressure applied in the same way as above. Thereafter, high-temperature adhesion resistance was evaluated by evaluating a state of adhesion of a contact part between the test pieces by the same evaluation method and evaluation criteria as above. In addition, for the samples formed with the coating layer using some organic compounds and the samples not formed with the coating layer, a time until adhesion occurred and the Ni layer as an underlayer was exposed when a large surface pressure was applied was measured and recorded.

<Evaluation Results>

For Samples A1 to A16 and Samples B1 to B16 respectively formed with the coating layer on the surface of the hard Ag layer and the surface of the soft Ag layer using various organic compounds and Sample B17 including the hard Ag layer formed with no coating layer, evaluation results on adhesion resistance and high-temperature adhesion resistance at room temperature when the large surface pressure and the small surface pressure were applied are shown in Tables 1 and 2 below.

TABLE 1

| Sample No. | Organic Compound for Forming Coating Layer | Ag layer | Surface Pressure | Adhesion Resistance (Room Temp) | High-Temp Adhesion Resistance |
|---|---|---|---|---|---|
| A1 | propanethiol | Hard | small | A+ | A |
| | | Ag | large | A+ | A |
| A2 | isobutyl mercaptan | | small | A+ | A |
| | | | large | A+ | A |
| A3 | 3-mercapto-2-butanone | | small | A+ | A |
| | | | large | A+ | A |
| A4 | 3-isopropyl | | small | A+ | A |
| | mercaptopropionate | | large | A+ | A |
| A5 | 1,6-hexanedithiol | | small | A+ | A |
| | | | large | A+ | A |
| A6 | benzenethiol | | small | A+ | A+ |
| | | | large | A+ | A |
| A7 | 2-aminobenzenethiol | | small | A+ | A+ |
| | | | large | A+ | A |
| A8 | thiobenzoic Acid | | small | A+ | A+ |
| | | | large | A+ | A |
| A9 | 4-isopropylbenzenethiol | | small | A+ | A+ |
| | | | large | A+ | A |
| A10 | 6-phenylamino-1,3,5-triazine- | | small | A+ | A+ |
| | 2,4-dithiol | | large | A+ | A+ |
| A11 | 2-mercaptobenzothiazole | | small | A+ | A+ |
| | | | large | A+ | A+ |
| A12 | tris [2-(3- | | small | A+ | A+ |
| | mercaptopropionyloxy)ethyl] | | large | A+ | A+ |
| | isocyanurate | | | | |
| A13 | 4-mercaptopyrizine | | small | A+ | A+ |
| | | | large | A+ | A+ |
| A14 | thiocyanuric acid | | small | A+ | A+ |
| | | | large | A+ | A+ |
| A15 | 6-(dibutylamino)-1,3,5- | | small | A+ | A+ |
| | triazine-2,4-dithiol | | large | A+ | A+ |
| A16 | 2-mercaptobenzimidazole | | small | A+ | A+ |
| | | | large | A+ | A+ |

TABLE 2

| Sample No. | Organic Compound for Forming Coating Layer | Ag layer | Surface Pressure | Adhesion Resistance (Room Temp) | High-Temp Adhesion Resistance |
|---|---|---|---|---|---|
| B1 | propanethiol | Soft | small | A | B |
| | | Ag | large | B | B |
| B2 | isobutyl mercaptan | | small | A | B |
| | | | large | B | B |
| B3 | 3-mercapto-2-butanone | | small | A | B |
| | | | large | B | B |
| B4 | 3-isopropyl | | small | A | B |
| | mercaptopropionate | | large | B | B |

TABLE 2-continued

| Sample No. | Organic Compound for Forming Coating Layer | Ag layer | Surface Pressure | Adhesion Resistance (Room Temp) | High-Temp Adhesion Resistance |
|---|---|---|---|---|---|
| B5 | 1,6-hexanedithiol | | small | A | B |
| | | | large | B | B |
| B6 | benzenethiol | | small | A | B |
| | | | large | A | B |
| B7 | 2-aminobenzenethiol | | small | A | B |
| | | | large | A | B |
| B8 | thiobenzoic Acid | | small | A | B |
| | | | large | A | B |
| B9 | 4-isopropylbenzenethiol | | small | A | B |
| | | | large | A | B |
| B10 | 6-phenylamino-1,3,5-triazine-2,4-dithiol | | small | A | B |
| | | | large | A | B |
| B11 | 2-mercaptobenzothiazole | | small | A | B |
| | | | large | A | B |
| B12 | tris [2-(3-mercaptopropionyloxy)ethyl] isocyanurate | | small | A | B |
| | | | large | A | B |
| B13 | 4-mercaptopyrizine | | small | A | B |
| | | | large | A | B |
| B14 | thiocyanuric acid | | small | A | B |
| | | | large | A | B |
| B15 | 6-(dibutylamino)-1,3,5-triazine-2,4-dithiol | | small | A | B |
| | | | large | A | B |
| B16 | 2-mercaptobenzimidazole | | small | A | B |
| | | | large | A | B |
| B17 | None | Hard Ag | small | A | B |
| | | | large | B | B |

According to Tables 1 and 2, the exposure of the Ni underlayer was confirmed at room temperature when the large surface pressure was applied in Sample B17 formed with no coating layer on the surface of the Ag layer (adhesion resistance: B). That is, even if the Ag layer is made of hard Ag, the adhesion of Ag occurs if the large surface pressure is applied and the Ag layers directly contact each other. In Samples B1 to B16 formed with the coating layer on the surface of the soft Ag layer, high adhesion resistance (A) was obtained at room temperature at least when the small surface pressure was applied. However, the high-temperature adhesion resistance was low (B) regardless of which compound was used to form the coating layer. That is, even if the Ag layer is made of soft Ag relatively susceptible to adhesion, the adhesion of Ag can be suppressed in a room-temperature environment by providing the coating layer made of the organic compound having the mercapto group on the surface of the Ag layer, but the adhesion of Ag cannot be sufficiently suppressed in a high-temperature environment.

On the other hand, in any of Samples A1 to A16 formed with the coating layer on the surface of the hard Ag layer, very high adhesion resistance was obtained at room temperature regardless of the surface pressure (A+). That is, the adhesion of Ag is less likely to occur by providing the coating layer made of the organic compound having the mercapto group on the surface of the hard Ag layer than by providing a similar coating layer on the surface of the soft Ag layer. Further, high-temperature adhesion resistance was also high in all of Samples A1 to A16 (A or A+). As compared to low high-temperature adhesion resistance in any of Samples B1 to B16 provided with the coating layer on the surface of the soft Ag layer (B), high-temperature adhesion resistance is remarkably higher. That is, the adhesion of Ag is less likely to occur and the adhesion of Ag in a high-temperature environment is particularly effectively suppressed by providing the coating layer on the surface of the hard Ag layer as compared to the case where the coating layer is provided on the surface of the soft Ag layer.

If the high-temperature adhesion resistances of Samples A1 to A16 different in the type of the compound constituting the coating layer are compared to each other, an evaluation result of high (A) was obtained with either surface pressure in Samples A1 to A5 using the compound having no aromatic ring, whereas an evaluation result of very high (A+) was obtained even with the small surface pressure in Samples A6 to A9 using the compound having an aromatic ring, which is not a heteroaromatic ring, and an evaluation result of very high (A+) was obtained with the large surface pressure in Samples A10 to A16 using the compound having a heteroaromatic ring. From this, the effect of suppressing the adhesion of the Ag layer at high temperatures is found to be higher by forming the coating layer using the organic compound having the aromatic ring as in Samples A6 to A16 than using the organic compound having no aromatic ring as in Samples A1 to A5. Above all, in the case of using the organic compound having the heteroaromatic ring containing a hetero atom, the effect of suppressing the adhesion of the Ag layer at high temperatures is particularly high.

Next, a time until the exposure of the Ni underlayer with the large surface pressure under a high-temperature environment is shown in Table 3 below for cases where no coating layer was formed on the surfaces of the hard Ag layer and the soft Ag layer and cases where the coating layers were formed using some of the organic compounds. Except Sample B18, the respective samples listed in Table 3 correspond to the samples of the same numbers listed in Tables 1 and 2.

TABLE 3

| Sample No. | Organic Compound for Forming Coating Layer | Ag layer | Surface Pressure | Time until Exposure of Ni Underlayer |
|---|---|---|---|---|
| A10 | 6-phenylamino-1,3,5-triazine-2,4-dithiol | hard Ag | large | 1000 hours or more |
| A11 | 2-mercaptobenzothiazole | | | 1000 hours or more |
| A14 | thiocyanuric acid | | | 1000 hours or more |

TABLE 3-continued

| Sample No. | Organic Compound for Forming Coating Layer | Ag layer | Surface Pressure | Time until Exposure of Ni Underlayer |
|---|---|---|---|---|
| B17 | None | | | 24 hours |
| B10 | 6-phenylamino-1,3,5-triazine-2,4-dithiol | soft Ag | | 120 hours |
| B11 | 2-mercaptobenzothiazole | | | 120 hours |
| B14 | thiocyanuric acid | | | 100 hours |
| B18 | none | | | 12 hours |

According to Table 3, the time until the exposure of the Ni underlayer was longer by providing the coating layer than by providing no coating layer regardless of whether the Ag layer was made of hard Ag or soft Ag and which of the organic compounds was used. That is, the adhesion of Ag is unlikely to advance by forming the coating layer. If the sample provided with the coating layer on the hard Ag layer and the sample provided with the coating layer on the soft Ag layer are compared for the case where the coating layers were formed using the same organic molecules, the time until the exposure of the Ni underlayer is remarkably longer and the adhesion of Ag is less likely to advance when the coating layer was provided on the hard Ag layer. This also corresponds to the evaluation results on the adhesion resistance shown in Tables 1 and 2 described above. Note that the time of 1000 hours or more until the exposure of the Ni underlayer in the case of providing the coating layer on the surface of the hard Ag layer is sufficiently long in view of the adhesion suppressing effect required for connection terminals.

Further, as to how much the time until the exposure of the Ni underlayer was extended by providing the coating layer, the case of the hard Ag layer and the case of the soft Ag layer are compared. In the case of the soft Ag layer, the time until the exposure of the Ni underlayer is extended only by 10-fold by forming the coating layer. On the other hand, in the case of the hard Ag layer, the time until the exposure of the Ni underlayer is extended by 40-fold or more by forming the coating layer. That is, regardless of whether the Ag layer is made of soft Ag or hard Ag, the effect of suppressing the adhesion of Ag is obtained by providing the coating layer on the surface, but the adhesion suppressing effect brought about by the formation of the coating layer is found to be relatively large in the case of the hard Ag layer. From this, as seen from the comparison of Samples A1 to A16 and Samples B1 to B16 in Tables 1 and 2, differences in the magnitude of an effect of improving the adhesion by the formation of the coating layer can be said to also contribute to a phenomenon in which the adhesion resistance and high-temperature adhesion resistance in the samples provided with the coating layer are higher when the Ag layer is made of hard Ag than when the Ag layer is made of soft Ag, in addition to a contribution of a difference in the hardness of the Ag layer itself. That is, by making the Ag layer to be covered by the coating layer of hard Ag, a very high effect of suppressing the adhesion of Ag is obtained by the magnitude of the effect brought about by the formation of the coating layer in addition to a high hardness of the Ag layer itself.

Although the embodiment of the present disclosure has been described in detail above, the present invention is not limited by the above embodiment at all and various changes can be made without departing from the gist of the present invention.

LIST OF REFERENCE NUMERALS

1 electrical connection member material (connection material)
10 metal material
11 base material
12 underlayer
13 Ag layer
2 coating layer
20 female connector terminal
21 resilient contact piece
21*a* embossed portion
22 inner facing contact surface
23 narrow pressure portion
30 male connector terminal

What is claimed is:

1. An electrical connection member material, comprising:

a metal material having an outermost surface that includes a silver (Ag) layer, the Ag layer having a surface hardness of 90 HV or more; and a coating layer contacting and covering the outermost surface of the metal material, the coating layer constituted by an organic compound having a mercapto group, wherein the coating layer is formed by bringing the organic compound and an aromatic ring into contact with the outermost surface of the metal material.

2. The electrical connection member material according to claim 1, wherein the aromatic ring is a hetero ring containing at least one of a sulfur (S) atom and a nitrogen (N) atom in addition to a carbon (C) atom.

3. An electrical connection member, comprising the electrical connection member material according to claim 1.

4. The electrical connection member according to claim 3, wherein:

the electrical connection member is configured as a connection terminal including a contact point portion to be brought into electrical contact with a mating electrically conductive member, and the coating layer is formed on the outermost surface of the metal material at least in the contact point portion.

5. The electrical connection member according to claim 4, wherein a surface pressure to be applied to the contact point portion is 30 MPa or more.

6. The electrical connection member material according to claim 1, wherein the Ag layer contains an additive element for hardening the Ag layer, in addition to silver (Ag) and unavoidable impurities, and the additive element is one of selenium (Se), carbon (C), and sulfur (S).

7. The electrical connection member material according to claim 1, wherein the metal material further includes:

a base material configured as a metal plate material of copper (Cu) or Cu alloy, and an underlayer provided between the base material and the Ag layer, the underlayer composed of at least one layer made of nickel (Ni) or Ni alloy.

8. The electrical connection member material according to claim 7, wherein the at least one layer comprising the underlayer includes two or more types of laminated metal layers.

* * * * *